(12) United States Patent
Itano et al.

(10) Patent No.: US 6,233,067 B1
(45) Date of Patent: *May 15, 2001

(54) METHOD OF AND APPARATUS FOR READING IMAGE BY FLATBED SCANNING

(75) Inventors: Yoshiharu Itano; Yoshihiro Kishida, both of Kyoto (JP)

(73) Assignee: Dainippon Screen Mfg. Co,. Ltd., Kyoto (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,051

(22) Filed: Sep. 22, 1997

(30) Foreign Application Priority Data

Sep. 25, 1996 (JP) .................................... 8-252892

(51) Int. Cl.[7] ...................................... H04N 1/04
(52) U.S. Cl. .......................... 358/491; 358/474; 358/497
(58) Field of Search .................. 358/491, 494, 358/496, 497, 474, 401, 403, 409, 412, 444, 470, 471, 475, 486, 487, 501, 505, 506; 382/317, 319; 399/1, 130; 250/234, 235, 236, 208.1

(56) References Cited

U.S. PATENT DOCUMENTS

| | | | |
|---|---|---|---|
| 4,580,172 | 4/1986 | Rajagopal . | |
| 4,809,086 | * 2/1989 | Horiya | 358/293 |
| 4,876,612 | * 10/1989 | Honma et al. | 358/474 |
| 4,958,236 | * 9/1990 | Nagashima et al. | 358/445 |
| 5,040,059 | * 8/1991 | Leberl | 348/135 |
| 5,132,810 | * 7/1992 | Kishida | 358/451 |
| 5,138,478 | 8/1992 | Ogawa . | |
| 5,161,038 | * 11/1992 | Hakkaku et al. | 358/496 |
| 5,225,851 | * 7/1993 | Schoon | 347/240 |
| 5,226,098 | * 7/1993 | Hirosawa | 382/180 |
| 5,283,668 | * 2/1994 | Hiramatsu | 358/474 |
| 5,570,206 | * 10/1996 | Yoshinaga | 358/497 |
| 5,592,304 | * 1/1997 | Udagawa et al. | 358/444 |
| 5,751,447 | * 5/1998 | Brook et al. | 358/487 |
| 5,805,311 | * 9/1998 | Phillips | 358/500 |
| 5,841,549 | * 11/1998 | Munakata | 358/296 |

FOREIGN PATENT DOCUMENTS

| | | |
|---|---|---|
| 31 04 606 | 9/1982 | (DE) . |
| 0 717 325 | 6/1996 | (EP) . |
| 59-070360 | 4/1984 | (JP) . |
| 3-001752 | 1/1991 | (JP) . |

* cited by examiner

*Primary Examiner*—Edward Coles
*Assistant Examiner*—Joseph R. Pokrzywa
(74) *Attorney, Agent, or Firm*—McDermott, Will & Emery

(57) ABSTRACT

A small-sized flatbed scanning type image reading apparatus for reading a wide-range image at high resolution is provided. An optical reading system (LU) is movable also in a main scanning direction (X) for high-resolution wide-range image reading. The optical reading system (LU) scans the image with the width of a section (SS1) to be read of elongated rectangular configuration in a subscanning direction (Y), and then is shifted in the main scanning direction to scan the image with the width of the next section (SS2) to be read. The remaining section (SS3) to be read is similarly scanned. The images of these three sections are combined together in consideration for the influences of overlap parts (OL1, OL2) of the sections.

12 Claims, 15 Drawing Sheets

METHOD OF AND APPARATUS FOR
READING IMAGE BY FLATBED SCANNING

BACKGROUND OF THE INVENTION

1. Field of the Invention

The present invention relates to a flatbed scanning type image reading apparatus for reading an image of an original by planar combination of main scanning and sub-scanning of the original and, more particularly, to an improvement for high-resolution wide-range image reading.

2. Description of the Background Art

There have been methods of optically reading images at high resolution by using a scanner having a wide reading area.

One of the conventional methods is such that a scanner comprising an optical zoom system and a lens switchable optical system limits an area to be read to read only a readable area of an original which is consistent with a high resolution.

Another conventional method is shown in the conceptual plan view of FIG. 14. A high-resolution lens system 901 is provided, and a plurality of linear photodetectors 902a to 902c are arranged at the imaging position of the lens system 901 in a line or substantially in a line in a main scanning direction. The photodetectors 902a to 902c detect respective partial images at high resolution. The image signals provided from the photodetectors are synthesized to form full image signals.

The above described conventional methods have drawbacks to be described below.

The first conventional method wherein the optically readable area is small has failed to read the full area of a large-sized original at high resolution. Further, this method has required a restriction in the position where an original is placed in many cases.

The second conventional method has involved the plurality of photodetector arrays to increase the size of the optical system and fabrication costs.

SUMMARY OF THE INVENTION

The present invention is directed to a method of reading an objective area of an original. According to the present invention, the method comprises the steps of: a) conducting an initial process comprising the step of: a-1) holding the original on an original table of a flatbed type; b) moving the original table in a first direction while reading a partial image of the objective area by image reading means; c) repeating the steps of: c-1) shifting the image reading means in a second direction; and c-2) returning to the step b), until a plurality of partial images covering the objective area is obtained; and d) combining the plurality of partial images to obtain a full image of the objective area.

The method achieves high-resolution wide-range image reading by reading the image signals of a plurality of sections at high resolution.

The present invention is also directed to an apparatus for reading an objective area of an original. According to the present invention, the apparatus comprises: a) an original table of a flatbed type on which an original is held; b) image reading means optically facing the original table; c) first drive means for moving the original table in a first direction; d) second drive means for shifting the image reading means in a second direction; e) first control means for controlling the first driving means to move the original table in the first direction while reading a partial image of the objective area of the original with the image reading means; i) second control means for controlling the second drive means to shift the image reading means in the second direction; g) repeating means for repeatedly activating the first and second control means until a plurality of partial images covering the objective area are obtained; and h) combining means for combining the plurality of partial images to obtain a full image of the objective area.

It is therefore an object of the present invention to provide a flatbed scanning type image reading apparatus which can achieve high-resolution wide-range image reading by using a relatively simple optical system.

These and other objects, features, aspects and advantages of the present invention will become more apparent from the following detailed description of the present invention when taken in conjunction with the accompanying drawings.

DESCRIPTION OF THE PREFERRED EMBODIMENTS

<1. Mechanical Structure and Apparatus Arrangement of Preferred Embodiment>

Figure 1:
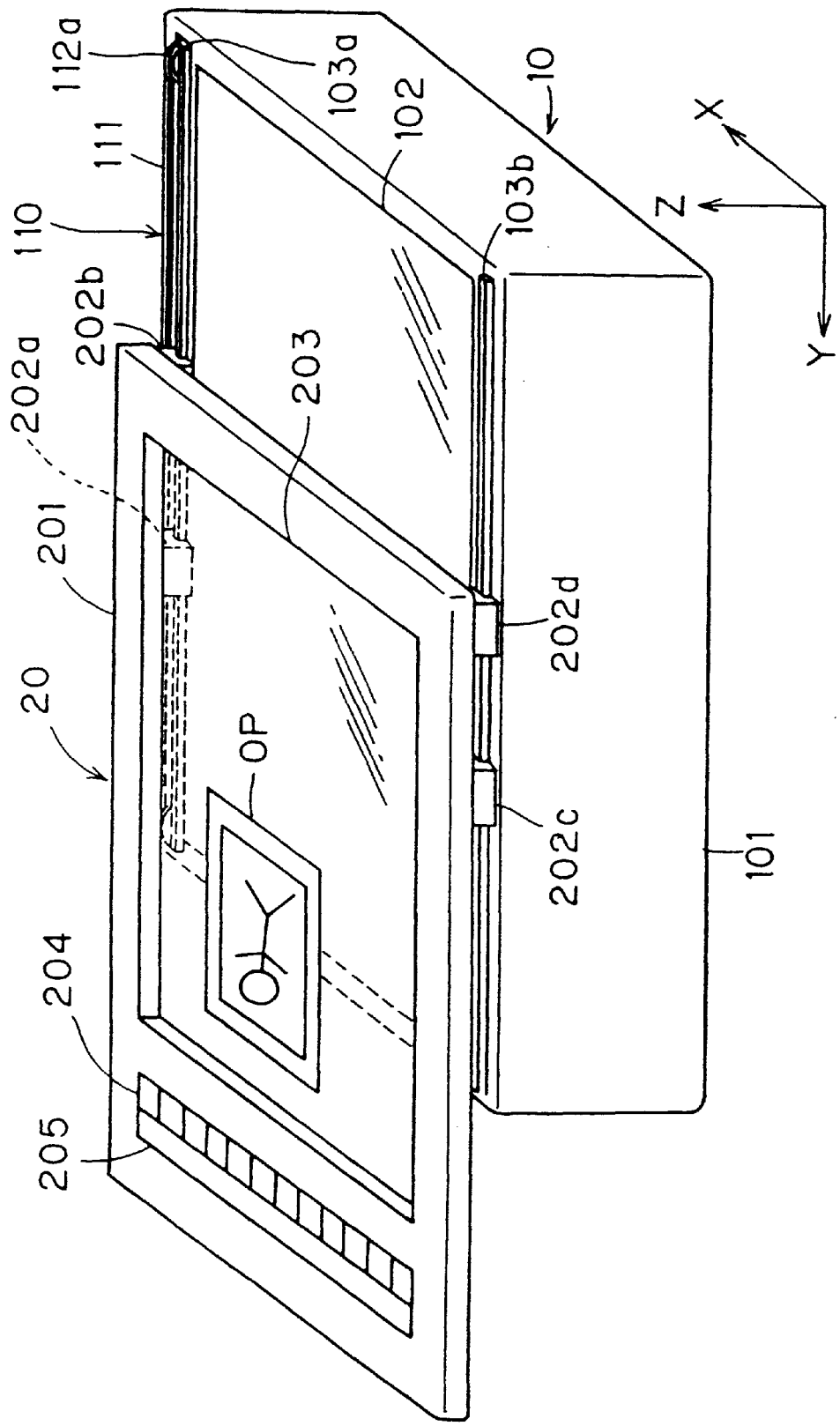
FIG. 1 is a perspective outside view of a flatbed scanning type image reading apparatus according to one preferred embodiment of the present invention.

FIG. 1 is a perspective outside view of a flatbed scanning type image reading apparatus 1 according to one preferred embodiment of the present invention. A three-dimensional coordinate system X-Y-Z wherein the X-Y plane corresponds to the horizontal plane and the Z-axis direction corresponds to the vertical direction, with an origin illustrated in a position relative to the apparatus, is defined in the figures except flow charts. The structure of the apparatus is described below with reference to FIG. 1.

The flatbed scanning type image reading apparatus comprises a body 10, an original table 20, a transmission-type light emitting portion 30, reflection-type light emitting portions 31a, 31b (see FIG. 3A), a monitor not shown, and an instruction entry portion not shown. The apparatus reads the image of an original OP placed on the original table 20.

The body 10 includes a case 101, a transparent plate 102 provided centrally on the upper surface of the case 101, and guide rails 103a, 103b arranged in the X-axis direction on opposite sides of the transparent plate 102 and extending in the Y-axis direction. An original table driving mechanism 110 (to be described later) for the original table 20 is provided adjacent the outside of the guide rail 103a that is remoter in the X-axis direction from the origin of the coordinate system than the guide rail 103b.

The original table 20 includes a transparent plate 203 in its center, and two pairs of linearly movable guides 202a to 202d provided on the lower surface of the original table 20 on opposite ends thereof as viewed in the Y-axis direction. The linearly movable guides 202a to 202d fit on the guide rails 103a and 103b of the body 10 for movement in the Y-axis direction to allow the entire original table 20 to move in the positive and negative directions of the Y-axis (sub-scanning direction; corresponding to a first direction). A reference line unit 204 having a multiplicity of reference lines arranged periodically in the X-axis direction and a shading correction unit 205 for shading correction for a CCD array (to be described later) are provided adjacent to each other on an end of the original table 20 as viewed in the Y-axis direction, and are used for an image combining process (to be described later). The reference lines are straight lines extending in the Y-axis direction.

Figure 2:
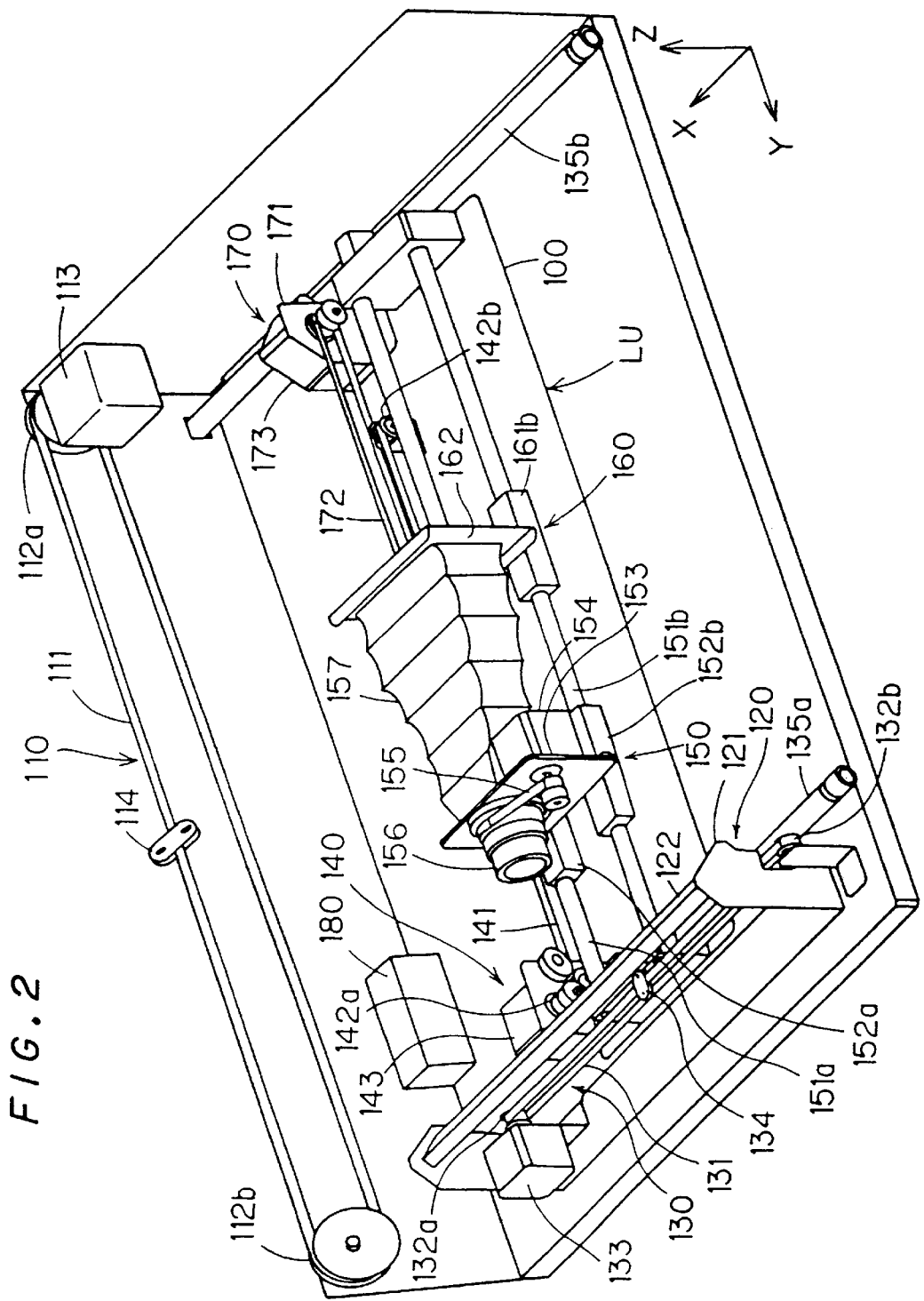
FIG. 2 illustrates internal mechanisms of the flatbed scanning type image reading apparatus of FIG. 1.
Figure 3A:
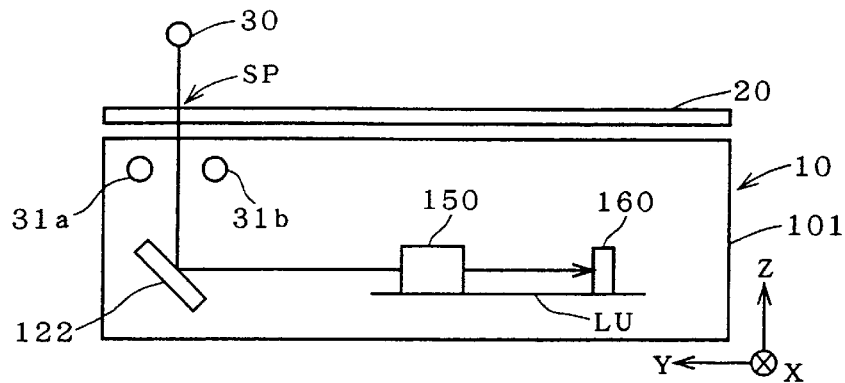
FIGS. 3A–3C conceptually illustrate the inside and top surface of the flatbed scanning type image reading apparatus of FIG. 1.
Figure 3B:
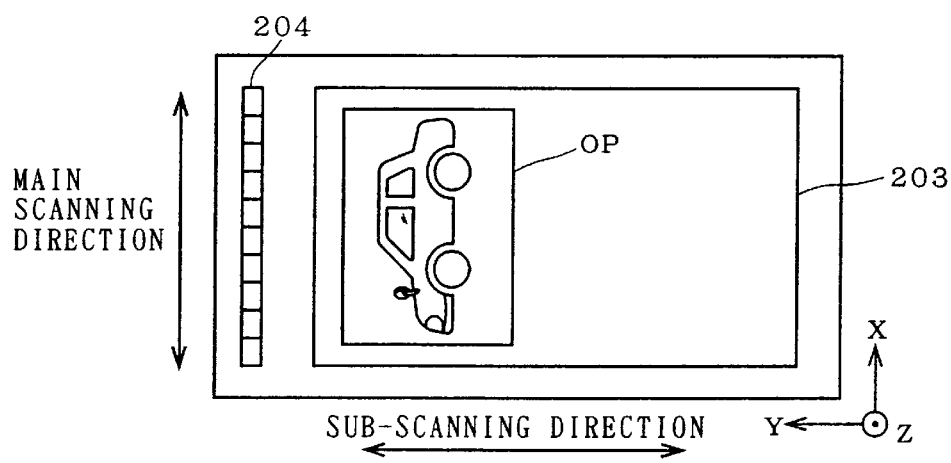
Figure 3C:
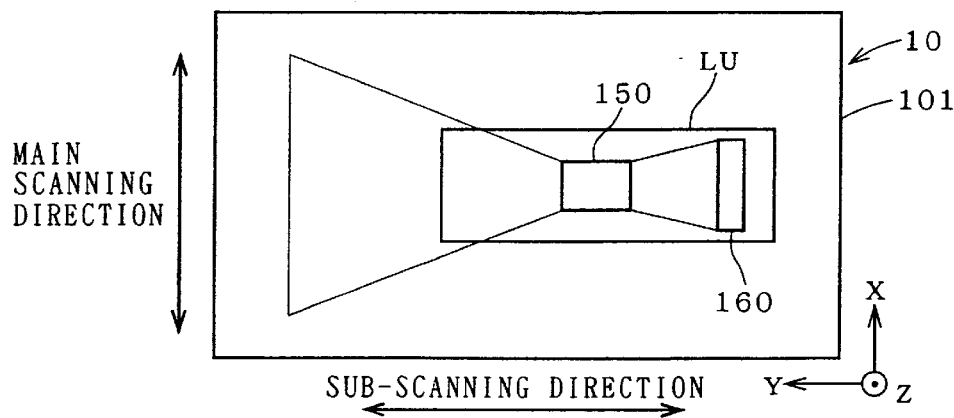

Referring to FIGS. 2 and 3A–3C, description is given on the internal mechanisms of the flatbed scanning type image reading apparatus of this preferred embodiment. FIG. 2 illustrates the internal mechanisms of this preferred embodiment. FIGS. 3A–3C conceptually illustrate the inside and top surface of this preferred embodiment.

The transmission-type light emitting portion 30 is located immediately over an image scanning position SP of the original table 20, and the reflection-type light emitting portion 31a and 31b are located within the body 10 adjacent the image scanning position SP, as illustrated in FIG. 3A. Whether to use the transmission-type light emitting portion 30 or the reflection-type light emitting portions 31a and 31b depends on the types of the original OP.

As shown in FIG. 2, the original table driving mechanism 110 (corresponding to first driving means) comprising a timing belt 111, pulleys 112a, 112b, a motor 113, and a fixedly bonded member 114 freely moves the original table 20 on the upper surface of the case 101 in the positive and negative directions of the Y-axis through the member 114 fixedly bonded to the original table 20.

A deflecting portion 120 including a support 121 and a light bending mirror 122 supported by the support 121 are provided on the inner bottom surface of the case 101 under the image scanning position SP and deflects light from the image scanning position SP of the original OP in the negative direction of the Y-axis.

A main scanning direction driving mechanism 130 (corresponding to second driving means) includes a timing belt 131, pulleys 132a, 132b, a motor 133, a fixedly bonded member 134, and shafts 135a, 135b. The main scanning direction driving mechanism 130 drives the timing belt 131 by rotation of the motor 133 to freely move an optical reading system LU (corresponding to image reading means) to be described later in a main scanning direction (the positive and negative directions of the X-axis; corresponding to a second direction) through the member 134 fixedly bonded to the optical reading system LU.

The optical reading system LU includes a lens portion driving mechanism 140, a lens portion 150, a photodetecting portion 160, and a photodetecting portion driving mechanism 170 which are placed on a plate 100 and are integrally freely movable in the main scanning direction.

The lens portion driving mechanism 140 of the optical reading system LU includes a timing belt 141, pulleys 142a, 142b, and a motor 143. The lens portion driving mechanism 140 drives the timing belt 141 by the rotation of the motor 143 to freely move the lens portion 150 to be described later in the sub-scanning direction (the positive and negative directions of the Y-axis).

In the lens portion 150, a fixed plate 153 is fixed on slide guides 152a and 152b through which shafts 151a and 151b extend, and a motor 154 fixed to the fixed plate 153 actuates a timing belt 155, changing the focal length of a zoom lens 156. The lens portion 150 is connected to the photodetecting portion 160 through bellows 157 so that the distance between the lens portion 150 and the photodetecting portion 160 is variable.

The photodetecting portion 160 including slide guides 161a (not shown) and 161b, a fixed plate 162 fixed on the slide guides 161a and 161b, and a CCD array provided on the fixed plate 162 and serving as linear photodetecting devices extending in the main scanning direction (X-axis direction) for receiving or detecting light. The photodetecting portion 160 generates an image signal as the CCD array detects light. The photodetecting portion 160 is connected to the photodetecting portion driving mechanism 170. The photodetecting portion driving mechanism 170 actuates a timing belt 172 by the rotation of a motor 173 fixed to a fixed plate 171 to move the photodetecting portion 160 in the subscanning direction (the positive and negative directions of the Y-axis).

A storage and control unit 180 (corresponding to first and second control means, repeating means, and combining means) is electrically connected (not shown) to the original table driving mechanism 110, the lens portion driving mechanism 140, the lens portion 150, the photodetecting portion 160, the photodetecting portion driving mechanism 170, the transmission-type light emitting portion 30, the reflection-type light emitting portions 31a, 31b, the monitor not shown, and the instruction entry portion not shown. The storage and control unit 180 containing a memory and a CPU controls the driving of the respective portions and stores the image signals generated by the photodetecting portion 160 to synthesize the stored image signals into a full image by the image combining process to be described later.

The flatbed scanning type image reading apparatus has the above described structure.

<2. Processing in Preferred Embodiment>

The flatbed scanning type image reading apparatus performs an image reading or inputting process to be described hereinafter.

FIGS. 3A–3C illustrates the position of the optical reading system LU for low-resolution wide-range image reading. In the illustration of FIGS. 3A–3C, the lens portion 150 moves in the negative direction of the Y-axis to increase the distance between the deflecting portion 120 and the lens portion 150 in order to perform the low-resolution wide-range image reading. That is, the main scanning range is increased for reading of a large-sized image.

Figure 4:
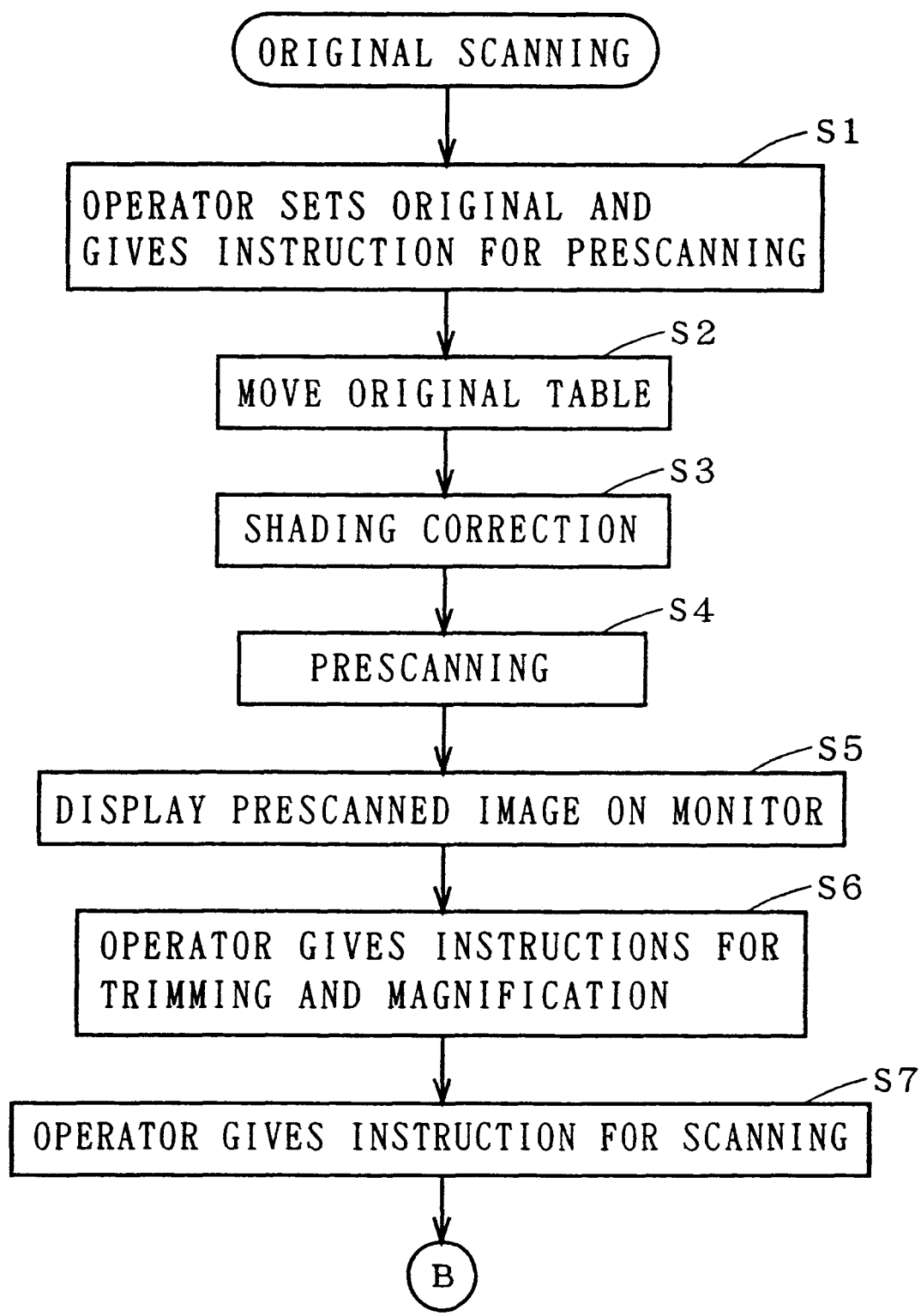
FIGS. 4 and 5 are a flow chart illustrating the procedure of an original scanning process.
Figure 5:
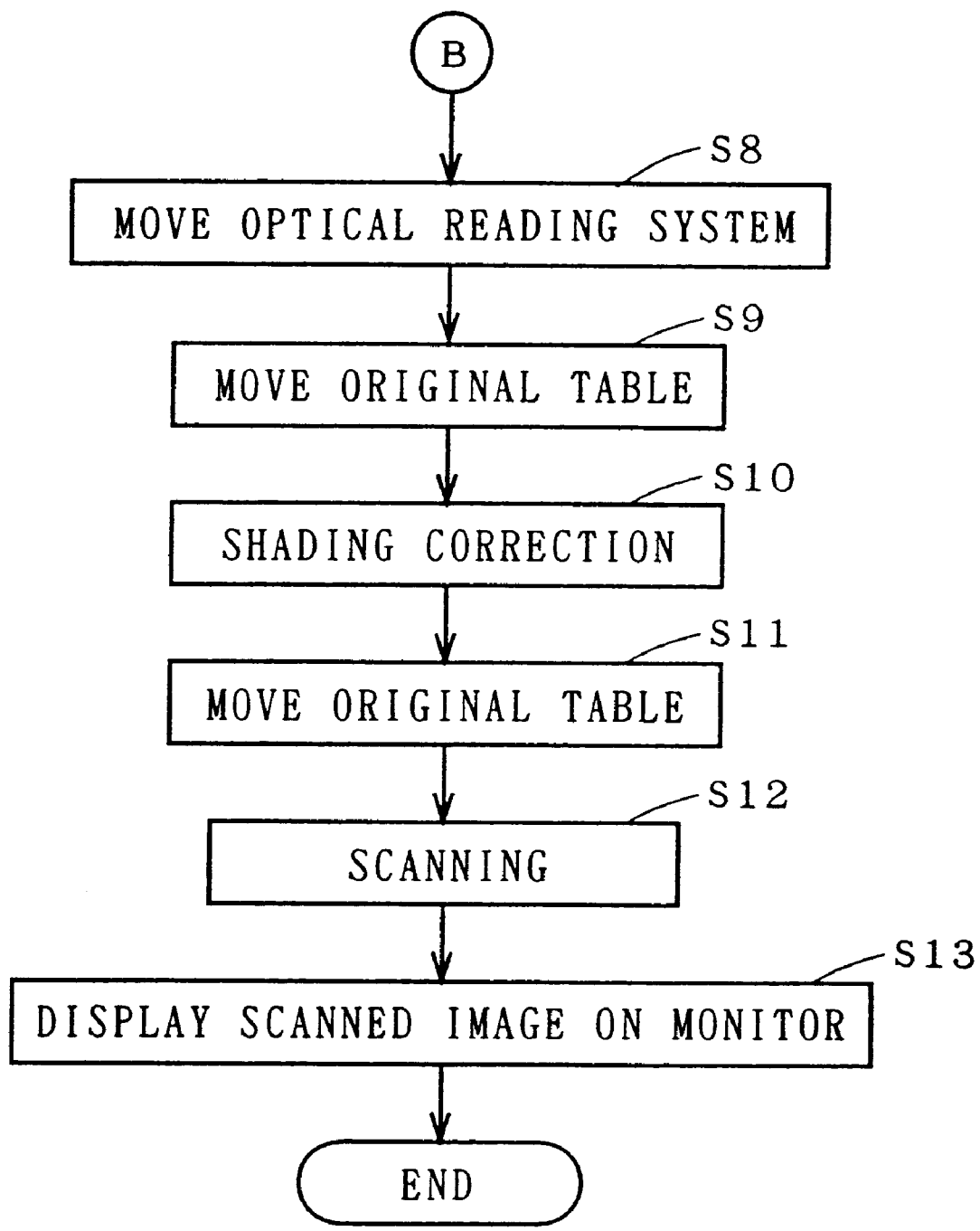

FIGS. 4 and 5 are a flow chart illustrating the procedure of an original scanning process.

The procedure of scanning of the original OP in the case of the low-resolution wide-range reading is described below in accordance with the flow chart of FIGS. 4 and 5.

First, an operator sets the original OP in a predetermined position on the original table 20 to give an instruction for prescanning by means of the instruction entry portion not shown (step S1).

This causes the original table 20 to move (step S2) until the shading correction unit 205 reaches the scanning position SP. This position of the original table 20 is a shading correction position.

The shading correction unit 205 reads a reference white surface to perform shading correction (step S3). Subsequently, the original OP is prescanned (step S4).

Then, the image read by prescanning is displayed on a monitor connected to the flatbed scanning type image reading apparatus (step S5).

While watching the image on the monitor, the operator gives instructions for trimming and an image magnification (step S6).

Thereafter, as the operator gives an instruction for regular scanning by means of the instruction entry portion not shown (step S7), the optical reading system LU moves in the main scanning and sub-scanning directions to a predetermined position (trimming position) in accordance with the entered trimming and image magnification (step S8), and the magnification of the lens portion 150 is changed to the entered magnification. Further, the lens portion 150 and the photodetecting portion 160 move within the optical reading system LU.

Next, the original table 20 with the original OP placed thereon is moved again to the shading correction position (step S9), and shading correction is performed (step S10).

The original table 20 is moved in the sub-scanning direction to the trimming position (step S11). Thereafter, the regular scanning is carried out (step S12).

Finally, the scanned image is displayed on the monitor (step S13). The regular scanning of the original OP is completed The scanning of the original OP in the case of the low-resolution wide-range image reading is discussed hereinabove.

High-resolution scanning is described hereinafter.

Figure 6A:
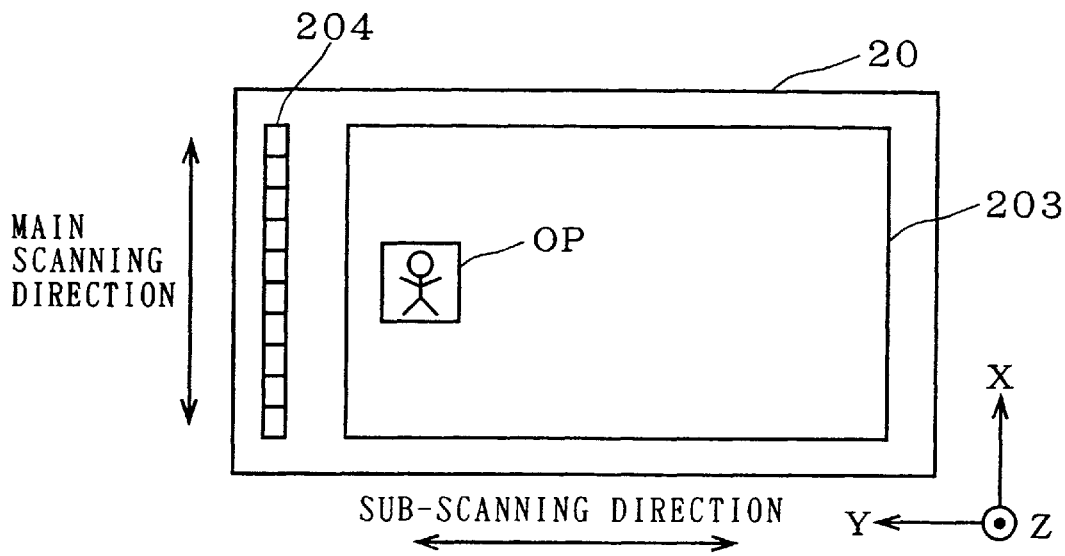
FIGS. 6A, 6B, 7A, and 7B illustrate the positions of an optical reading system for high-resolution small-range image reading.
Figure 6B:
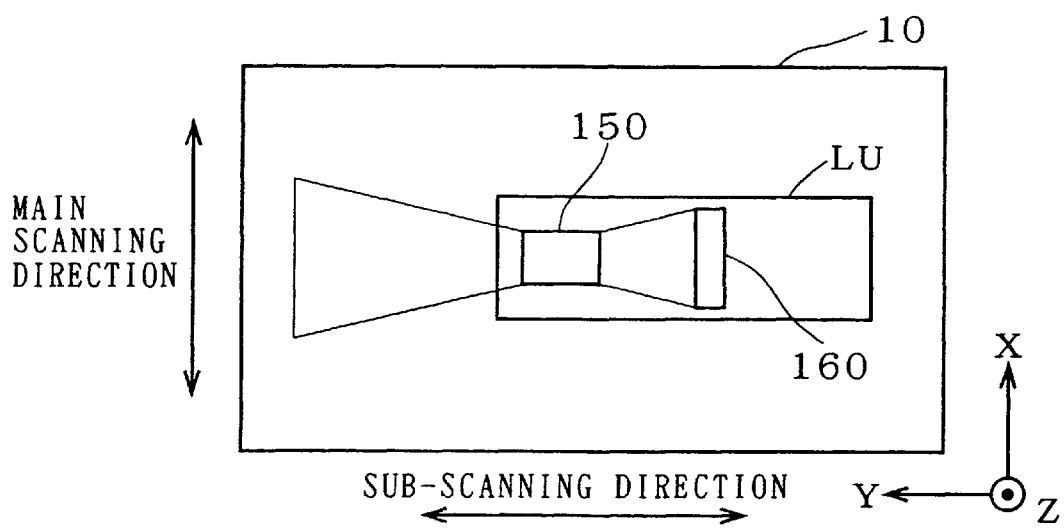

FIGS. 6A and 6B illustrate the position of the optical reading system LU in the case of high-resolution small-range image reading.

As shown, the lens portion 150 and the photodetecting portion 160 moves in the positive direction of the Y-axis within the optical reading system LU so as to approach the deflecting portion 120 for high-resolution scanning. The area to be read is accordingly small enough to be consistent with the original size. The optical reading system LU moves in the main scanning direction (X-axis direction) so that the area to be read overlaps the position where the original OP is set as viewed in the main scanning direction (X-axis direction), that is, the middle position of the transparent plate 203 as viewed in the main scanning direction in the illustration of FIGS. 6A and 6B.

Figure 7A:
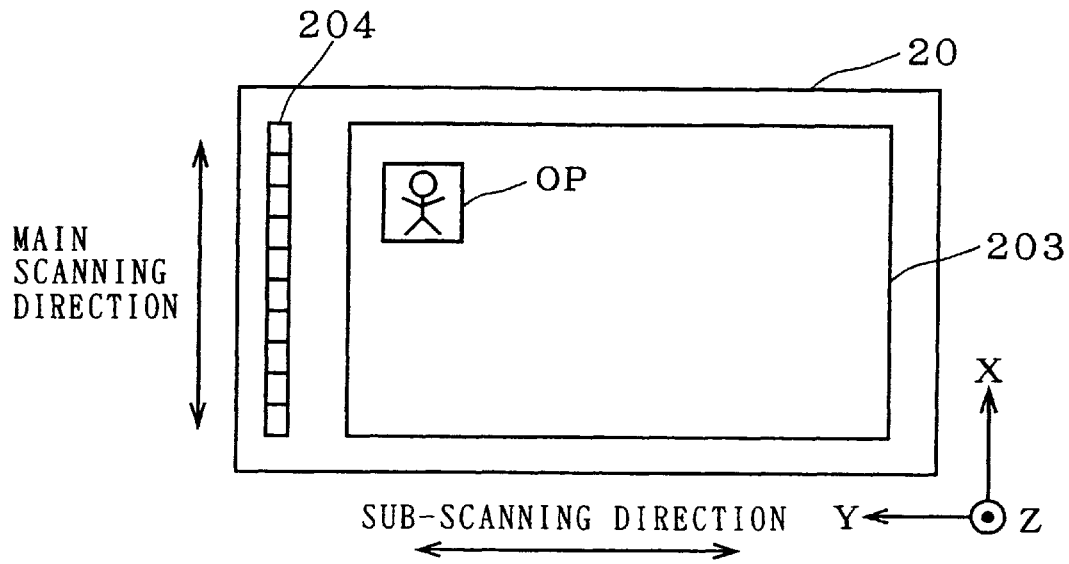
Figure 7B:
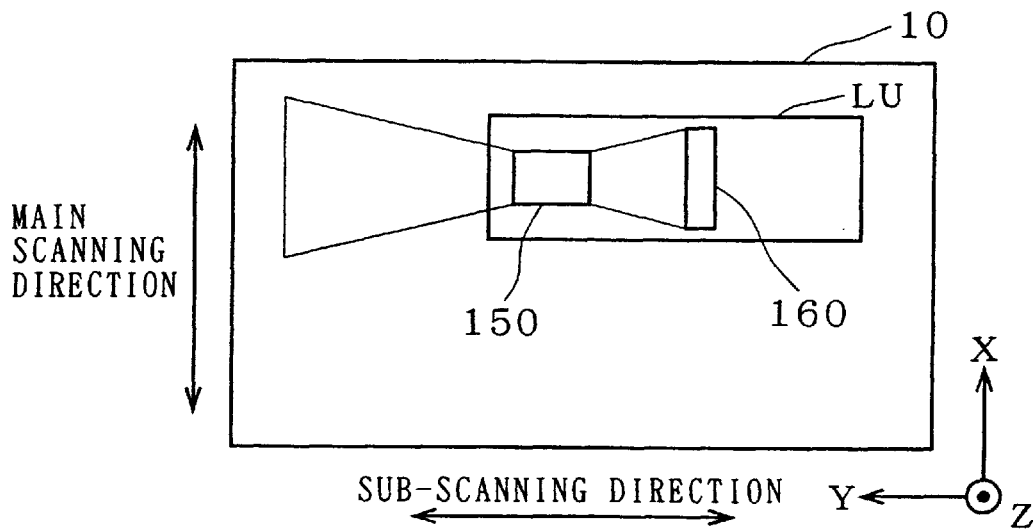

FIGS. 7A and 7B, similar to FIGS. 6A and 6B, illustrate the position of the optical reading system LU in the case of high-resolution small-range image reading. In the illustration of FIGS. 7A and 7B, the original OP is set in a position closer to the positive side of the transparent plate 203 as viewed in the X-axis direction. Since the image magnification in the illustration of FIGS. 7A and 7B is equal to that in the illustration of FIGS. 6A and 6B, the distance between the lens portion 150 and the deflector 120 is short. The optical reading system LU is positioned closer to the positive side of the transparent plate 203 as viewed in the X-axis direction so that the area to be read overlaps the original OP.

The original scanning process in the case of the high-resolution small-range scanning is similar to that shown in FIGS. 4 and 5. The optical reading system LU is positioned on the basis of the image provided by prescanning.

Figure 8:
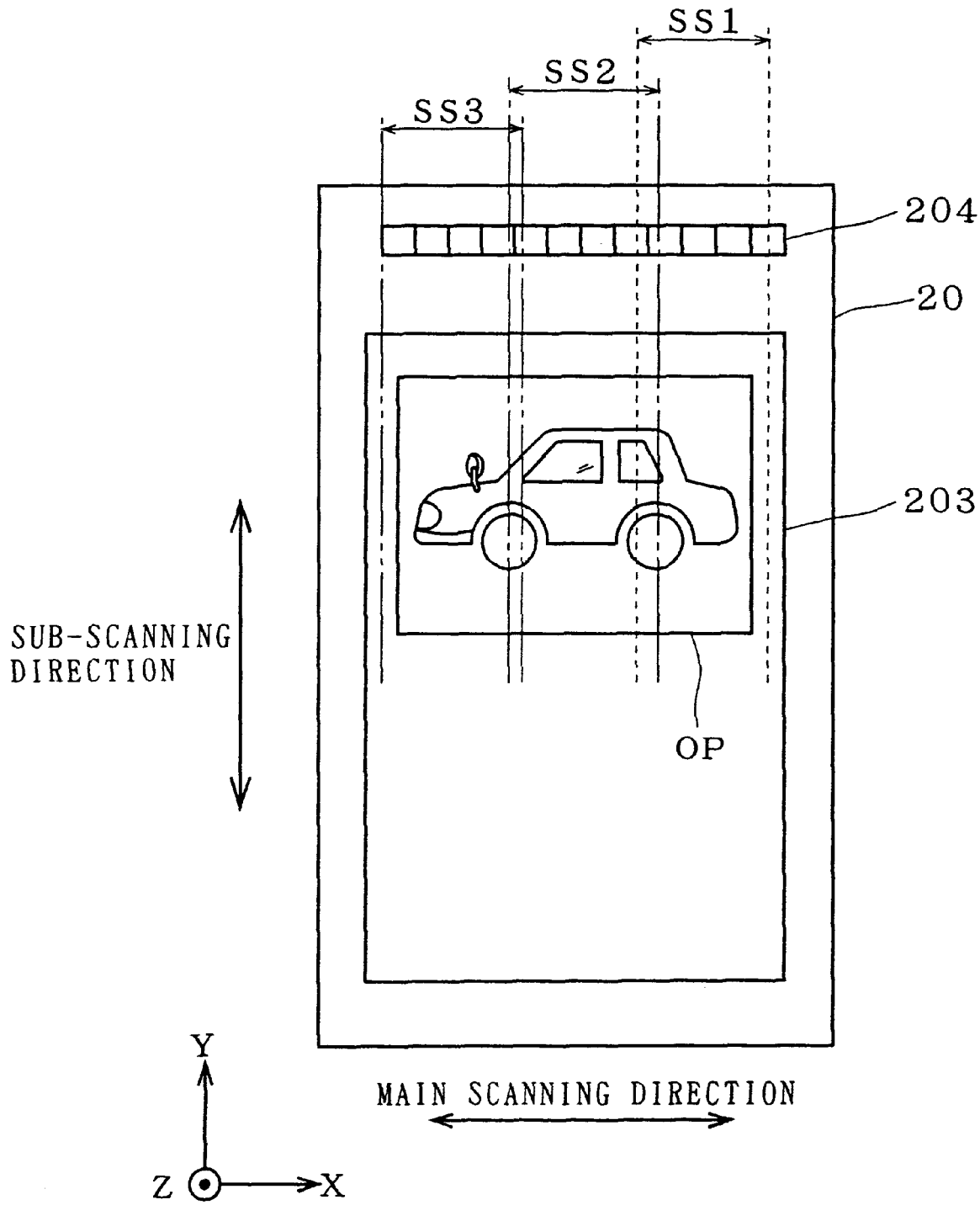
FIG. 8 illustrates sections to be read which are formed by division for high-resolution wide-range image reading.

High-resolution wide-range image reading as shown in FIG. 8 is discussed hereinafter.

Figure 9:
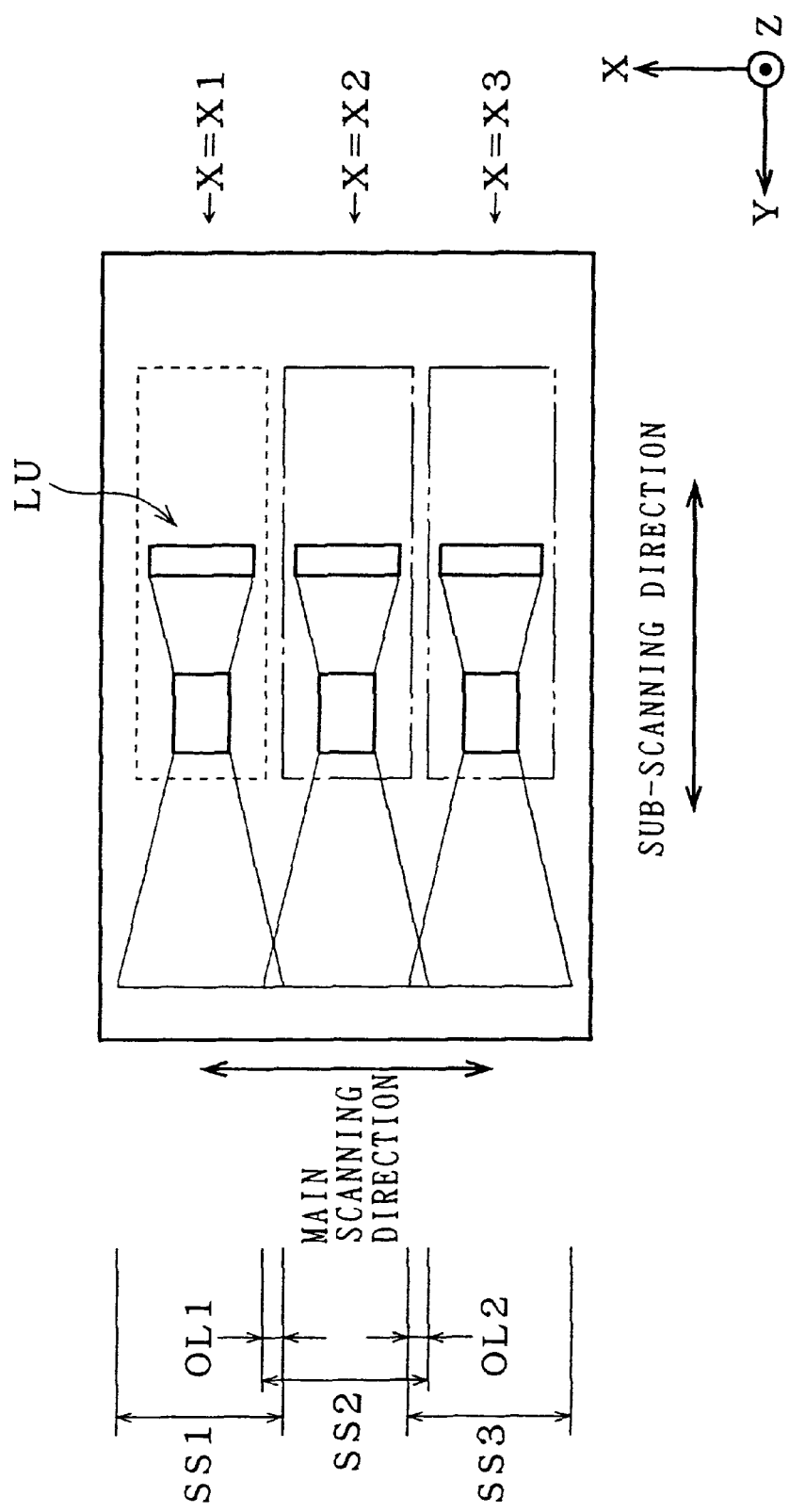
FIG. 9 illustrates the positions of the optical reading system for high-resolution wide-range image reading.

The high-resolution wide-range image reading involves a three-step shift of the optical reading system LU to three X-axis positions X=X1, X2, X3 and image scanning in the three respective positions, as illustrated in FIG. 9. Adjustment of the optical reading system LU to the high resolution decreases the width (dimension in the X-axis direction) of the area to be read during one scanning (as compared with that in the low-resolution scanning). Thus, the full range of a relatively large-sized original is not read during one scanning. A set of elongated rectangular areas to be read (three elongated rectangular areas to be read in FIG. 8) are used to cover the full range of the original.

This apparatus has the flexibility to move the optical reading system LU in the X-axis direction. It is accordingly preferred to take countermeasures against the movement/positioning errors of the optical reading system LU in the X-axis direction. If there are no image reading errors of the CCD array and no movement/positioning errors, the required process is only to divide a wide area including the full range of the original simply into three sections (referred to hereinafter as "simply separate sections"), to sequentially read the simply separate sections, and to simply combine the resultant images together. In practice, however, the presence of the above described errors makes it difficult to perfectly combine the resultant images together by using the above described simple division into three sections.

The apparatus overcomes the difficulties in such a manner that the spacing between the three X-axis stop positions X=X1, X2, X3 of the optical reading system LU is less than the spacing between the positions of the simply separate sections. More specifically, as illustrated in FIG. 9, sections SS1 to SS3 to be scanned and read by the optical reading system LU in the three X-axis stop positions X=X1, X2, X3 are established so as to have overlap parts OL1 and OL2.

The width (dimension in the X-axis direction) of the overlap parts OL1 and OL2 is greater than twice a maximum width ΔX (not shown) previously assumed on the basis of the movement/positioning errors. The reason why twice the maximum width ΔX assumed against the errors is determined as a reference is that a margin of at least twice the maximum width ΔX is required to prevent the sections SS1 and SS2 to be read from being separated, for example, when the section SS1 deviates by the maximum width ΔX in the positive direction of the X-axis and the adjacent section SS2 deviates by the maximum width ΔX in the negative direction of the X-axis.

The provision of the margin (the overlap parts OL1 and OL2) for error compensation necessitates measures to correctly combine the adjacent sections to be read together. The sections must be combined together with an accuracy of submicron order when considered on the scale of the CCD array.

The apparatus is adapted to read an array of reference lines on the reference line unit 204 adjacent the shading correction unit 205 when the optical reading system LU starts scanning in the positions X=X1, X2, X3. A synthetic boundary for the spatial synthesis (combination) of two partial images is determined on the basis of the relative relationship between the respective positions of a particular reference line commonly read in the overlap part OL1 by the scanning of the section SS1 and by the scanning of the section SS2.

The image combining process is described in detail hereinafter.

Figure 10A:
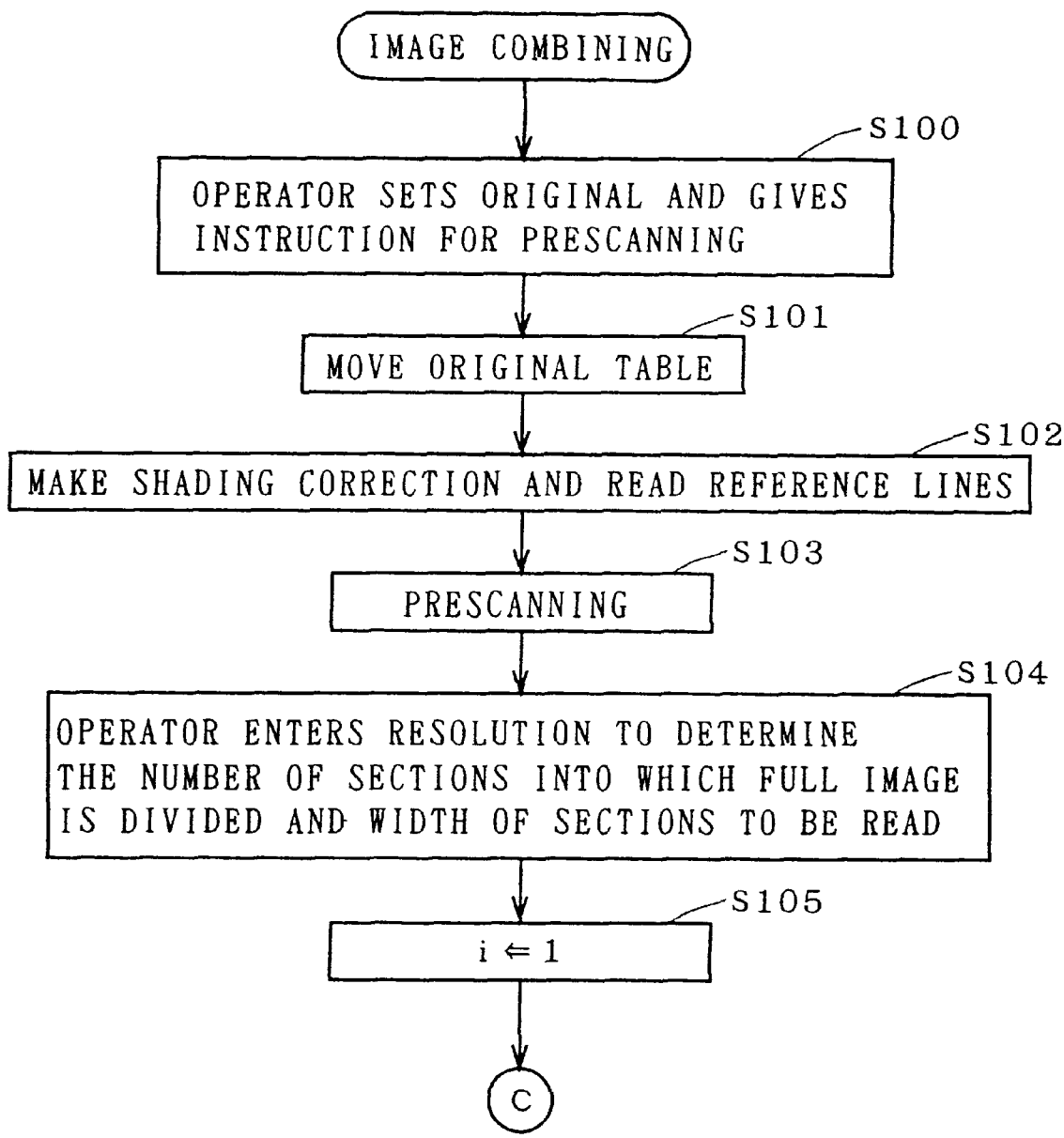
FIGS. 10A, 10B and 11 are a flow chart illustrating the procedure of an image combining process.
Figure 10B:
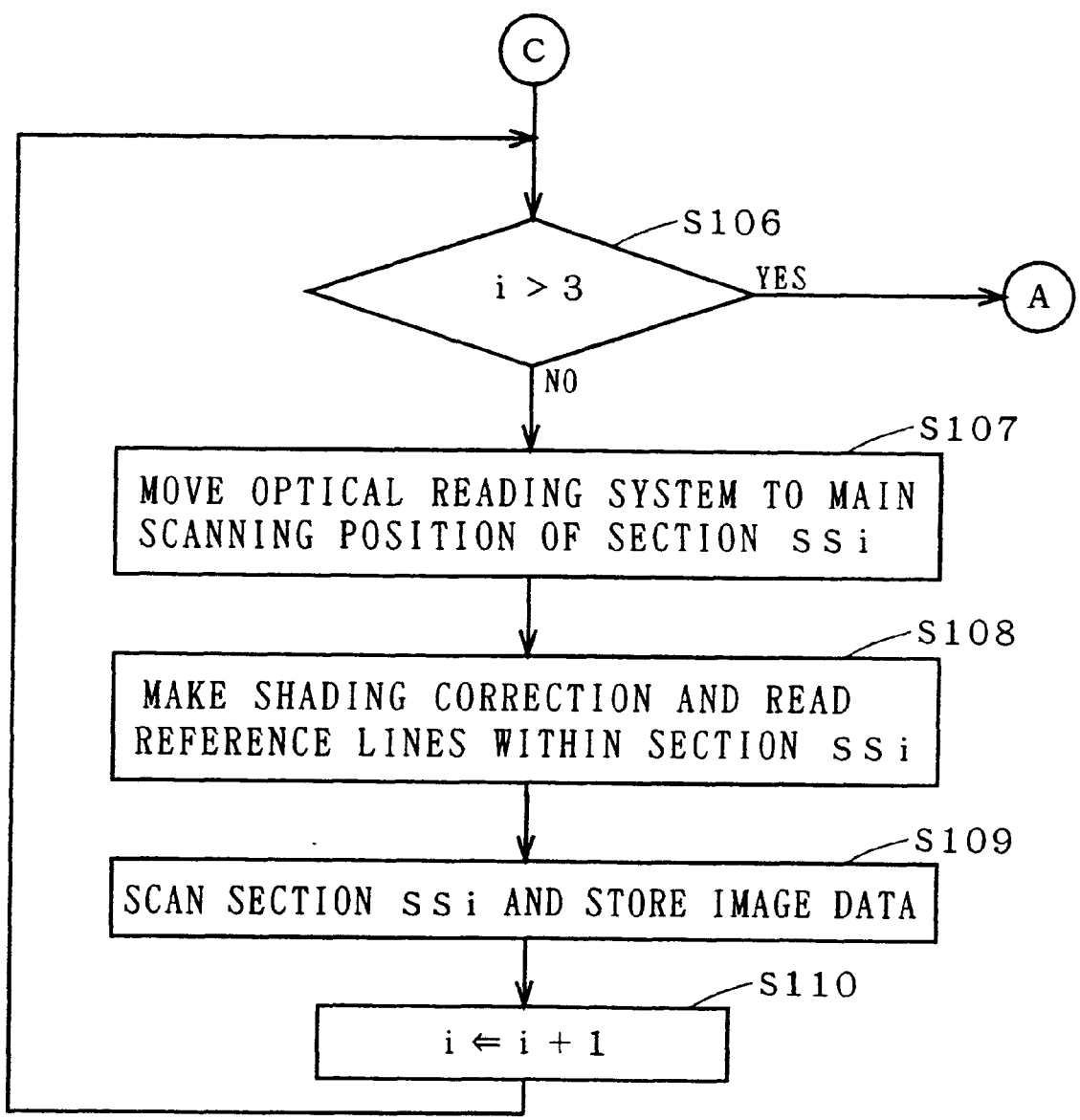
Figure 11:
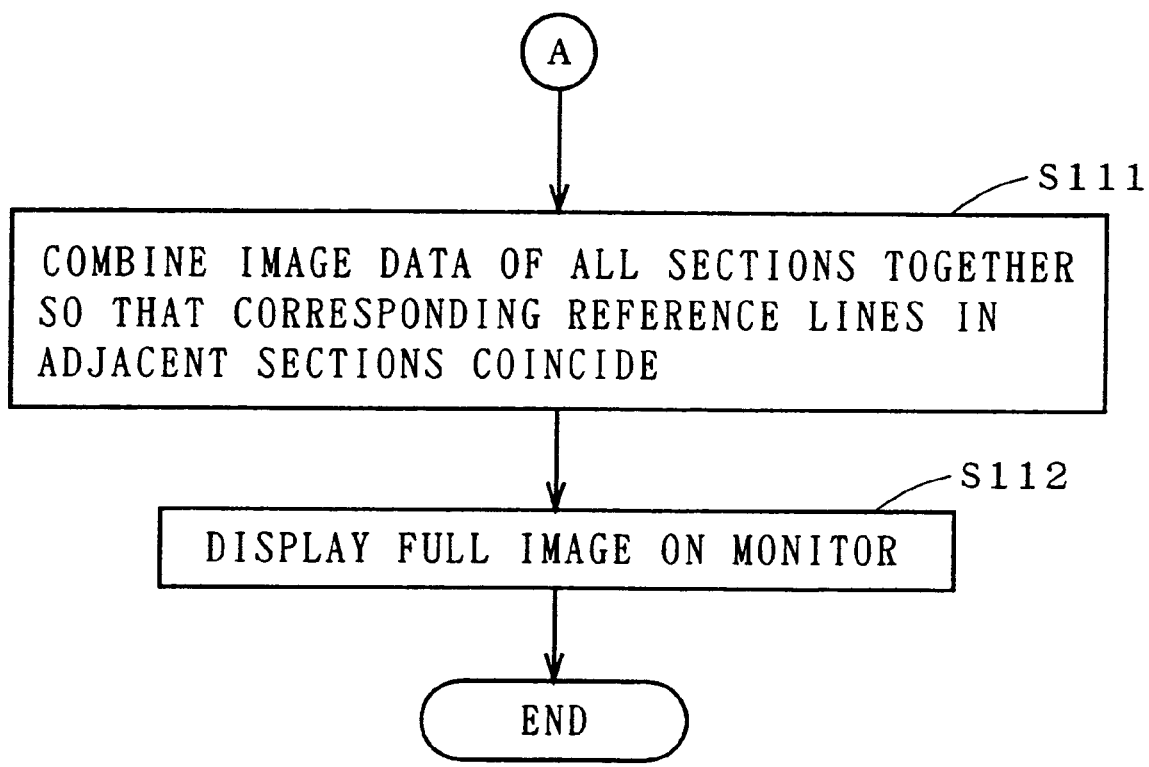
Figure 12A:
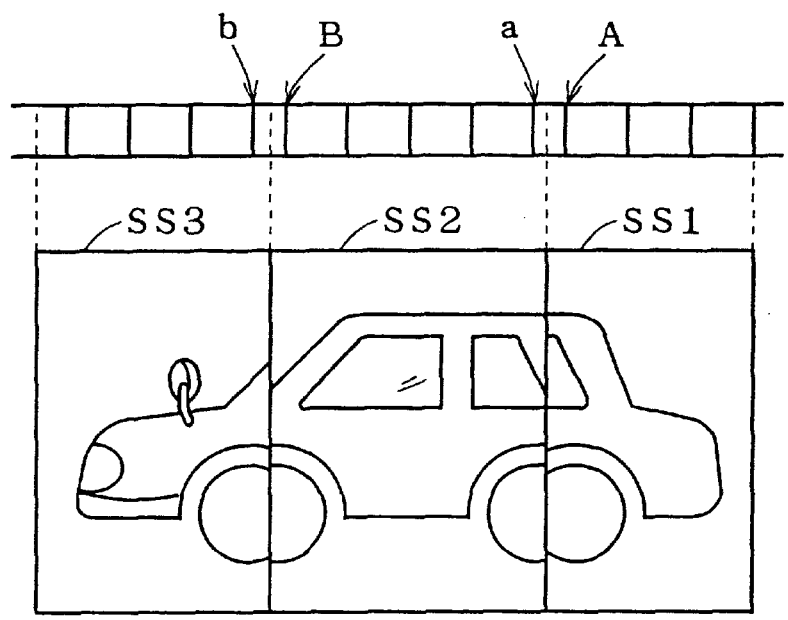
FIGS. 12A and 12B conceptually illustrate the image combining process.
Figure 12B:
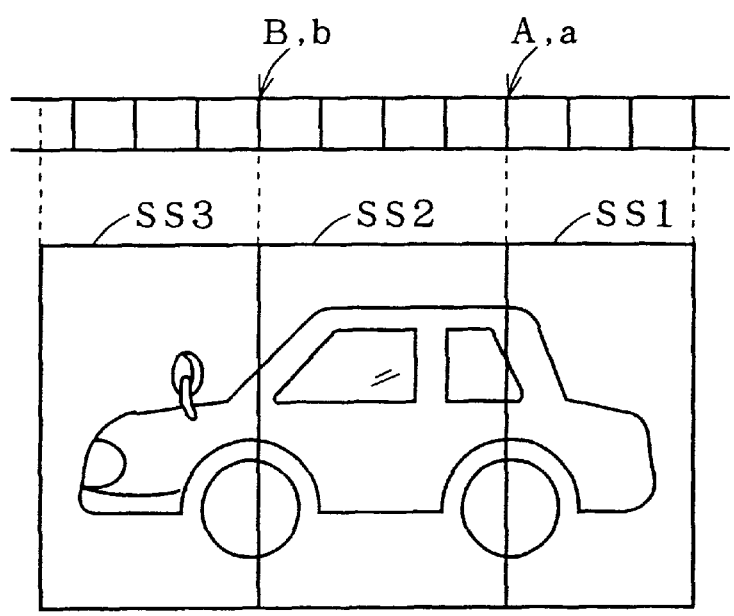

FIGS. 10A, 10B and 11 are a flow chart showing the procedure of the image combining process. FIGS. 12A and 12B conceptually illustrate the image combining process. The procedure of the image combining process is described below with reference to FIGS. 10a and 10B, 11, 12A, and 12B.

First, the operator sets the original OP in the trimming position in the sub-scanning direction on the original table 20, and then gives an instruction for prescanning by means of the instruction entry portion not shown (step S100). This causes the original table 20 to move (step S101) until the shading correction unit 205 reaches the scanning position SP.

The shading correction is made and the reference lines are read (step S102). Subsequently, the original OP is prescanned (step S103).

As the operator gives an instruction for a desired resolution by means of the instruction entry portion, the number of sections into which the full image is divided for image reading ("3" in this preferred embodiment) and the width of the sections to be read are specified and set among the parameters previously determined for each resolution and stored in the memory (step S104). The instruction for the resolution herein contains the concept of the magnification (resolution ratio) which is determined by the relationship between an input resolution in an input device and an output resolution in an output device. The number of sections and the width of the sections in the main scanning direction are adjusted so that each of the overlap parts OL1 and OL2 to be commonly read contains at least one reference line. The specific setting principles are described below.

The standard width (dimension in the X-axis direction) of the overlap parts OL1 and OL2 in ideal cases, for example, wherein the movement/positioning errors of the optical reading system LU and the reading errors of the CCD array are zero is designated by L (not shown), and the spacing between adjacent reference lines arranged in the X-axis direction is designated by $\Delta D$ (not shown).

For the above described reason is required:

$$L > 2\Delta X \qquad (1)$$

If the difference between L and $2\Delta X$ is designated by $\Delta L$ (>0), then $$L = 2\Delta X + \Delta L \qquad (2)$$

When the difference $\Delta L$ is greater than the reference line spacing $\Delta D$, each of the overlap parts OL1 and OL2 contains at least one reference line if an error exists.

Thus, the minimum width $\Delta L$ of the overlap parts OL1 and OL2 if a maximum error exists and the reference line spacing $\Delta D$ are determined to satisfy the relation:

$$\Delta L > \Delta D \qquad \text{(condition 1)}$$

However, the reference line spacing $\Delta D$ which is too small creates another problem. Specifically, when the reference line spacing $\Delta D$ is decreased so that the overlap part OL1 contains too many reference lines, it is difficult to judge which one of the reference lines read in the section SS2 adjacent to the section SS1 as those contained in the overlap part OL1 is equivalent to a particular reference line read in the section SS1 as that contained in the overlap part OL1, resulting in the need for particular data processing for the judgment.

The apparatus of this preferred embodiment solves the problem in such a manner that the reference line spacing $\Delta D$ is greater than the reading error $\Delta X$ at the reading positions X=X1, X2, X3.

That is, $$\Delta D > \Delta X \qquad \text{(condition 2)}$$

is satisfied.

The conditions 1 and 2 are combined in consideration for Expression (1).

$$\Delta L > \Delta D > \Delta X$$

This gives $$(L - 2\Delta X) > \Delta D > \Delta X \qquad \text{(condition 3)}$$

The reading error (maximum assumed reading error) $\Delta X$ and the width L of the overlap parts OL1 and OL2 in the condition 3 may be previously assumed or set. The reference line spacing $\Delta D$ is determined so that the condition 3 is satisfied for the values $\Delta X$ and L.

Referring again to FIG. 10, a parameter i for specifying the sections to be read is set to an initial value "1" (step S105).

Next, the parameter i is judged. If the parameter i is greater than the maximum value "3", the flow jumps to the step S111. If the parameter i is not greater than the maximum value "3", the flow proceeds to the step S107.

The operation when the parameter i is not greater than the maximum value "3" is described below. The optical reading system LU moves to the main scanning position (see FIG. 9) of a section SSi to be read (step S107). After the shading correction is made, the reference lines of the reference unit 204 contained within the section SSi are read (step S108). The section SSi is sequentially scanned, and the read image data are stored in the memory (step S109). When the scanning of that section is completed, the parameter i is incremented (step S110). Then, the flow returns to the step S106.

In this manner, the respective sections SSi are scanned in the steps S107 through S110 while the parameter i specifying the sections is incremented by "1" from "1". When the scanning of all of the sections is completed, the parameter i is "4", and the flow jumps to the step S111 based on the judgment in the step S106.

In the step S111, a particular reference line read at an end of each section which is closer in the X-axis direction to the origin is retrieved, and image signals of two adjacent sections are combined together so that the particular reference line read in one of the sections coincides with a reference line read in the other section (adjacent to the end of the former section which is closer in the X-axis direction to the origin) and corresponding to the particular reference line. This is shown in FIGS. 12A and 12B. Referring to FIG. 12A, the particular reference line at the end of the section SS1 which is closer in the X-axis direction to the origin is a reference line A; the latter section adjacent to the section SS1 is the section SS2; and the reference line read in the section SS2 and corresponding to the reference line A is a reference line a. The corresponding reference line in the section SS2 is readily specified in this manner since the condition 3 is satisfied.

In the process of the step S111, the image signals read in both of the sections in an overlapped manner by causing the reference lines A and a to coincide are removed, and the image signals for the respective sections (corresponding to a plurality of partial images) are combined together as illustrated in FIG. 12B. Likewise, a reference line B in the section SS2 corresponds to a reference line b in the section SS3 as shown in FIG. 12A. The image signals of the sections SS2 and SS3 are combined together so that the reference lines B and b coincide, as illustrated in FIG. 12B.

In the step S112, the resultant full image signals are stored in the memory and displayed on the monitor not shown. The image combining process is completed.

The apparatus of this preferred embodiment provides the full image signals at high resolution in this manner.

The number of sections into which the full image is divided is "3" in this preferred embodiment. However, the number of sections other than "3" is selected, for example "2" and "4", depending upon the entered resolution and the size of the original. The optical reading system LU may stop at any position within the movable range in the X-axis direction and scan the image at that position. To increase the resolution, for example, the entire area to be read is divided into four sections. On the other hand, to provide a slightly lower resolution than that in the case of the three-section division, the entire area to be read is divided into two sections. In either case, the overlap parts of adjacent sections are provided similarly to those in the case of the three-section division.

As hereinabove described, the flatbed scanning type image reading apparatus of this preferred embodiment comprises the optical reading system LU movable in the main scanning direction within a predetermined range relative to the original table 20 for sequentially producing image signals of the plurality of sections SSi for the original OP. The storage and control unit combines the image signals of the plurality of sections together to provide the full image signals. Therefore, the apparatus may read the image signals of the respective sections at high resolution to achieve the high-resolution wide-range image reading.

Additionally, the optical reading system LU of the flatbed scanning type image reading apparatus of this preferred embodiment may stop at any position within the movable range in the X-axis direction (the main scanning direction) to read the image at that position. Thus, the apparatus may be used at various resolutions (accordingly, with the various numbers of sections).

<3. Variations>

In the above described preferred embodiment, at least one reference line is contained in the overlap part of adjacent sections to be read for high-resolution wide-range image reading. The present invention, however, is not limited to this structure. The size and the number of sections to be read may be adjusted so that only one reference line is necessarily contained in the overlap part. The entered resolution need not be used as it is, but a suitable range of the resolution of the image may be provided so that only one reference line is necessarily contained in the overlap part.

The number of sections to be read into which the full image is divided and the width (dimension in the main scanning direction) of the sections are automatically set for the high-resolution wide-range image reading in the above described preferred embodiment. Instead, the operator may enter the number of sections and the width of the sections.

Further, the light bending mirror bends the scanning light in the negative direction of the Y-axis into the lens portion and the photodetecting portion in the above described preferred embodiment. Alternatively, the photodetecting devices may directly receive the scanning light directed from above the scanning position.

Figure 13:
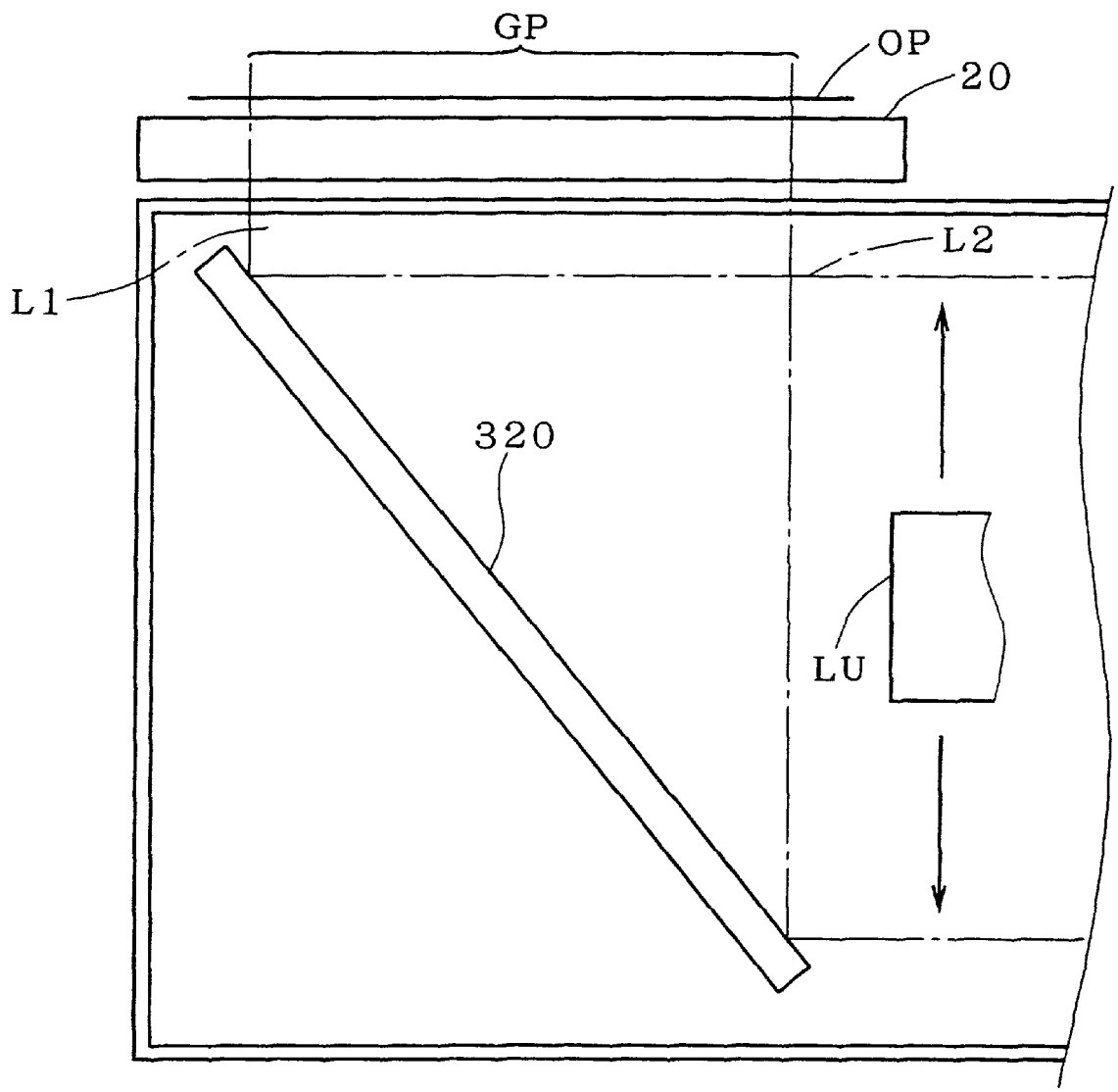
FIG. 13 illustrates a modification of the flatbed scanning type image reading apparatus.
Figure 13:
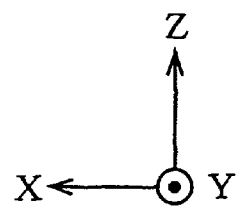
Figure 14:
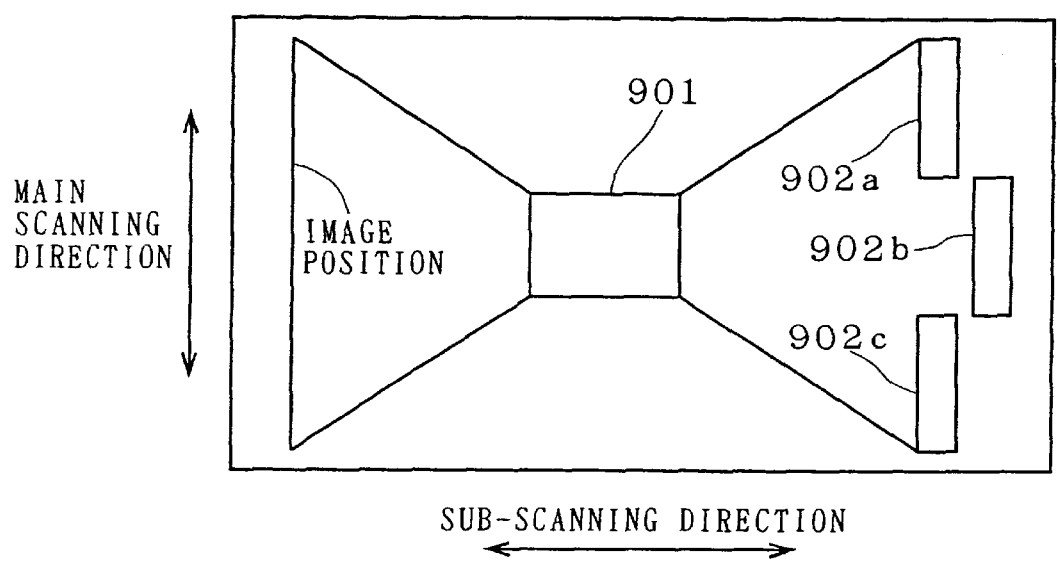
FIG. 14 conceptually illustrates a conventional apparatus.

Furthermore, the direction of the movement of the optical reading system LU in the above described preferred embodiment should correspond to the main scanning direction in optical terms. A modification may be made to the image reading apparatus as shown in FIG. 13, for example, in such a manner that the optical path is bent at right angles using a mirror so that the bent light is received by the photodetecting devices. In the modification, with the coordinate axes set as shown in FIG. 13, a deflector 320 bends at right angles light L1 from a linear image part GP extending in the X-axis direction in the original OP placed on the original table 20 to direct linear light L2 extending in the Z-axis direction to the photodetecting devices for main scanning. In such a case, the optical reading system LU should be movable in the Z-axis direction as indicated by the arrows in FIG. 13.

While the invention has been described in detail, the foregoing description is in all aspects illustrative and not restrictive. It is understood that numerous other modifications and variations can be devised without departing from the scope of the invention.

We claim:

1. A method of reading an objective area of an original, comprising the steps of:

a) conducting an initial process comprising the step of:
   a-1) holding said original on an original table of a flatbed type;

b) moving said original table in a first direction while reading a partial image of said objective area by image reading means linearly extending in a second direction and operable to obtain a partial image signal representing a partial image of said objective area;

c) repeating the steps of:
   c-1) shifting said image reading means in said second direction on the basis of said number of said sections into which a full image is divided and said width of said sections to be read as specified and shifting said image reading means to one position which is serially selected from said plurality of positions for each repetition of step c);
   c-2) storing said partial image signal in a memory; and
   c-3) returning to step b),
   until a plurality of partial image signals representing a plurality of partial images covering said objective area is obtained in said memory; and d) combining said plurality of partial image signals to obtain a full image signal representing a full image of said objective area, wherein said plurality of partial images serially overlap by a predetermined overlap width in said second direction; and wherein said overlap width is wider than twice a maximum reading error of said image reading means previously estimated, and wherein step a) further comprises the steps of:
   a-2) reading a parameter from said memory corresponding to a resolution for reading instructed by an operator to specify a number of sections into which said full image is divided and a width of said sections to be read,
      designating a resolution at which said image reading means reads each one of said plurality of partial images of said objective area; and
      deciding a plurality of positions in said second direction as a function of said designated resolution.

2. The method in accordance of claim 1, wherein:

said original table is provided with a set of reference lines, the step b) comprises the step of:

b-1) reading a sub-set of said reference lines together with said partial image to thereby obtain a reference image, and the step d) comprises the step of d-1) combining said plurality of partial images with reference to said reference image.

3. The method in accordance of claim 2, wherein:

said set of reference lines are periodically provided on said original table at a predetermined interval which is shorter than the said positioning error of said image reading means.

4. An apparatus for reading an objective area of an original, comprising:

a) an original table of a flatbed type on which an original is held;

b) a photodetector linearly extending in a second direction and optically facing said original table;

c) first drive means for moving said original table in a first direction;

d) second drive means for shifting said photodetector in said second direction;

e) instruction means for instructing a desired resolution for reading by an operator;

f) specifying means for reading a parameter from a memory corresponding to said resolution for reading as instructed to specify a number of sections into which a full image is divided and a width of said sections to be read;

g) first control means for controlling said first driving means to move said original table in said first direction while enabling said photodetector to thereby obtain a partial image signal representing a partial image of said objective area;

h) second control means for controlling said second drive means to shift said photodetector to thereby obtain a partial image signal representing a partial image of said objective area;

i) repeating means for repeatedly activating said first and second control means until a plurality of partial image signals representing a plurality of partial images covering said objective area are obtained;

j) memory means for storing said plurality of partial image signals; and k) combining means for combining said plurality of partial image signals to obtain a full image signal representing a full image of said objective area.

5. The apparatus in accordance with claim 4, wherein:

a plurality of positions are defined in said second direction; and said second control means comprises:

f-1) means for controlling said second drive means to shift said photodetector to one position which is serially selected from said plurality of positions for each activation of said repeating means.

6. The apparatus in accordance with claim 5, wherein:

said first control means comprises:

e-1) means for controlling said photodetector to read said partial image at said resolution, and said plurality of positions are defined as a function of said resolution.

7. The apparatus in accordance of claim 6, wherein:

said plurality of partial images serially overlap by a predetermined overlap width in said second direction.

8. The apparatus in accordance with claim 7, wherein:

said overlap width is wider than twice a maximum reading error of said photodetector previously estimated.

9. The apparatus in accordance with claim 8, wherein:

said original table is provided with a set of reference lines, said first control means further comprises:

e-2) means for controlling said photodetector to read a sub-set of said reference lines together with said partial image to thereby obtain a reference image, and said combining means comprises:

h-1) means for combining said plurality of images with reference to said reference image.

10. The apparatus in accordance with claim 9, wherein:

said set of reference lines are periodically provided on said original table at a predetermined interval which is shorter than the positioning error of said photodetector.

11. The apparatus in accordance of claim 10, wherein:

the condition:

$$L - 2\Delta X > \Delta D > \Delta X$$

is satisfied, where:

L is said overlap width, $\Delta X$ is said maximum reading error, and $\Delta D$ is said interval of said set of reference lines.

12. The apparatus in accordance of claim 11, wherein:

said original table is further provided with a reference table for shading correction at a position adjacent to said set of reference lines.

* * * * *